(12) United States Patent
Umebayashi et al.

(10) Patent No.: US 8,464,643 B2
(45) Date of Patent: Jun. 18, 2013

(54) RAILCAR BODYSHELL REINFORCING METHOD AND RAILCAR BODYSHELL

(75) Inventors: Tomonori Umebayashi, Kobe (JP); Atsuyuki Kubo, Kobe (JP); Fumihide Inamura, Kakogawa (JP); Hiroshi Sugiura, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 13/266,321

(22) PCT Filed: May 26, 2010

(86) PCT No.: PCT/JP2010/003521
§ 371 (c)(1),
(2), (4) Date: Nov. 23, 2011

(87) PCT Pub. No.: WO2010/143365
PCT Pub. Date: Dec. 16, 2010

(65) Prior Publication Data
US 2012/0067247 A1   Mar. 22, 2012

(30) Foreign Application Priority Data
Jun. 10, 2009 (JP) .................................. 2009-138844

(51) Int. Cl.
*B61D 25/00* (2006.01)
(52) U.S. Cl.
USPC .......................................... 105/396; 105/397
(58) Field of Classification Search
USPC ............ 105/396, 397, 400, 404, 409; 156/60, 156/280
See application file for complete search history.

(56) References Cited

U.S. PATENT DOCUMENTS

| | | | |
|---|---|---|---|
| 5,042,395 A * | 8/1991 | Wackerle et al. | 105/397 |
| 5,333,554 A * | 8/1994 | Yamada et al. | 105/397 |
| 5,433,151 A * | 7/1995 | Ohara et al. | 105/397 |
| 5,669,999 A * | 9/1997 | Anderegg et al. | 156/173 |
| 5,685,229 A * | 11/1997 | Ohara et al. | 105/397 |
| 5,890,435 A * | 4/1999 | Thoman et al. | 105/404 |
| 6,196,136 B1 * | 3/2001 | Yoshizaki et al. | 105/396 |
| 6,554,348 B1 * | 4/2003 | Gernstein | 296/178 |
| 6,866,329 B2 * | 3/2005 | Clifford | 296/181.1 |
| 7,958,831 B2 * | 6/2011 | Campus | 105/396 |
| 2007/0214998 A1 * | 9/2007 | Komaki et al. | 105/396 |

(Continued)

FOREIGN PATENT DOCUMENTS

| | | |
|---|---|---|
| JP | A-58-030373 | 2/1983 |
| JP | U-58-73068 | 5/1983 |

(Continued)

OTHER PUBLICATIONS

International Search Report issued in International Patent Application No. PCT/JP2010/003521 dated Aug. 24, 2010.

*Primary Examiner* — Jason C Smith
(74) *Attorney, Agent, or Firm* — Oliff & Berridge, PLC

(57) ABSTRACT

A method for reinforcing a railcar bodyshell according to the present invention includes the steps of: in a bodyshell including a metal frame and a metal plate joined to the frame and formed such that a cross section orthogonal to a railcar longitudinal direction has a wave shape, disposing a fiber sheet on at least a part of the plate; and forming a fiber reinforced resin member by bonding the fiber sheet to the part of the plate by an impregnated adhesive resin.

6 Claims, 9 Drawing Sheets

U.S. PATENT DOCUMENTS

| | | | |
|---|---|---|---|
| 2007/0295240 A1* | 12/2007 | Campus | 105/396 |
| 2008/0011188 A1* | 1/2008 | Campus | 105/401 |
| 2012/0042805 A1* | 2/2012 | Umebayashi et al. | 105/396 |
| 2012/0067247 A1* | 3/2012 | Umebayashi et al. | 105/396 |

FOREIGN PATENT DOCUMENTS

| | | |
|---|---|---|
| JP | A-05-213189 | 8/1993 |
| JP | A-06-263029 | 9/1994 |
| JP | A-07-081556 | 3/1995 |
| JP | A-07-172304 | 7/1995 |
| JP | A-10-246000 | 9/1998 |
| JP | B2-3219278 | 10/2001 |
| JP | A-2003-314085 | 11/2003 |
| JP | A-2005-076230 | 3/2005 |
| JP | A-2007-112344 | 5/2007 |
| JP | A-2007-332674 | 12/2007 |
| JP | A-2009-024466 | 2/2009 |
| JP | A-2009-046931 | 3/2009 |

* cited by examiner

RAILCAR BODYSHELL REINFORCING METHOD AND RAILCAR BODYSHELL

TECHNICAL FIELD

The present invention relates to a method for reinforcing a railcar bodyshell including a wave-shaped plate and a frame and to the railcar bodyshell.

BACKGROUND ART

Railcar bodyshells made of stainless steel, aluminum, or the like have been conventionally known. As a roof board of a roof bodyshell of a railcar or a floor panel of an underframe of the railcar, a corrugated panel (hereinafter referred to as a "thin wavy plate") which has a wave-shaped cross section and is small in thickness is used to reduce the weight of the railcar while maintaining the strength thereof. Conventionally, weak portions of the roof bodyshell and underframe of the railcar have been reinforced by, for example, welding of reinforcing plates so as to be increased in stiffness. However, in a case where the weak portion to be reinforced is a part of the thin wavy plate, it is difficult to join a reinforcing member to the weak portion by welding or bolts. For example, in the case of the welding, one problem is that manufacturing accuracy deteriorates by thermal distortion, and in the case of the bolts, another problem is that a bolt hole is damaged and this deteriorates seal performance (hereinafter referred to as "water-tightness") for preventing the ingress of water. Further, yet another problem is that the weights of the roof board and the floor panel increase by reinforcement.

Here, each of PTLs 1 to 4 proposes a technique to use a carbon fiber reinforced resin for the outside plate and frame member of the railcar. In accordance with these techniques, the railcar bodyshell can be significantly reduced in weight.

CITATION LIST

Patent Literature

PTL 1: Japanese Laid-Open Patent Application Publication No. 5-213189
PTL 2: Japanese Laid-Open Patent Application Publication No. 6-263029
PTL 3: Japanese Laid-Open Patent Application Publication No. 7-81556
PTL 4: Japanese Patent No. 3219278

SUMMARY OF INVENTION

Technical Problem

However, in accordance with these techniques, since major portions of the railcar bodyshell are formed by the carbon fiber reinforced resin, a use ratio of the carbon fiber reinforced resin in the bodyshell is high. Compared to metals, the cost of the carbon fiber reinforced resin is high, and it is difficult to recycle the carbon fiber reinforced resin. Therefore, the problem is that in a case where the railcar bodyshell includes the major portions fowled by the carbon fiber reinforced resin, the cost thereof significantly increases and the recyclability thereof deteriorates. On this account, in consideration of the cost and the recyclability, the thin wavy plate made of a metal, such as stainless steel, is used for the bodyshell. However, currently, the weak portion of the thin wavy plate cannot be appropriately reinforced. Moreover, in a case where a component formed by the carbon fiber reinforced resin has a three-dimensional shape, a step of forming the carbon fiber reinforced resin into a predetermined shape is required, and this deteriorates manufacturing efficiency.

Here, an object of the present invention is to appropriately maintaining the cost, recyclability, and manufacturing efficiency of the railcar bodyshell while improving the manufacturing accuracy and water-tightness thereof and reducing the carbody weight thereof.

Solution to Problem

A railcar bodyshell reinforcing method of the present invention includes the steps of: in a bodyshell including a metal frame and a metal plate joined to the frame and formed such that a cross section thereof orthogonal to a railcar longitudinal direction has a wave shape, disposing a fiber sheet on at least a part of the plate; and forming a fiber reinforced resin member by bonding the fiber sheet to the part of the plate by an impregnated adhesive resin. Here, the "fiber sheet" is a sheet which is formed such that fibers, such as carbon fibers, utilized in a fiber reinforced resin are formed like a cloth and which is not impregnated with a resin.

In accordance with the above method, the fiber sheet having flexibility is spread on a part of the metal plate having a wave-shaped cross section and is impregnated with and bonded by the impregnated adhesive resin. With this, the fiber reinforced resin member bonded to the plate can be easily formed, and the bodyshell can be reinforced by a simple process while reducing the carbody weight thereof. Moreover, since the fiber sheet is disposed on a part of the plate, impregnated and bonded, the manufacturing accuracy does not deteriorate by the thermal distortion, and the water-tightness does not deteriorate by the damage on the bolt hole. In addition, since the fiber sheet is disposed on a part of the plate, and the frame and plate that are major portions are made of metal, the cost and the recyclability can be appropriately maintained. As above, the cost, recyclability, and manufacturing efficiency of the railcar bodyshell can be appropriately maintained while improving the manufacturing accuracy and water-tightness thereof and reducing the carbody weight thereof.

Moreover, a railcar bodyshell of the present invention includes: a metal frame; a metal plate joined to the frame and formed such that a cross section thereof orthogonal to a railcar longitudinal direction has a wave shape; and a fiber reinforced resin member joined to a part of the plate and reinforcing the plate.

In accordance with the above configuration, as with the above, the cost, recyclability, and manufacturing efficiency can be appropriately maintained while improving the manufacturing accuracy and water-tightness and reducing the carbody weight.

Advantageous Effects of Invention

In accordance with the present invention, the cost, recyclability, and manufacturing efficiency of the railcar bodyshell can be appropriately maintained while improving the manufacturing accuracy and water-tightness thereof and reducing the carbody weight thereof.

DESCRIPTION OF EMBODIMENTS

Hereinafter, embodiments of the present invention will be explained in reference to the drawings.

Embodiment 1

Figure 1:
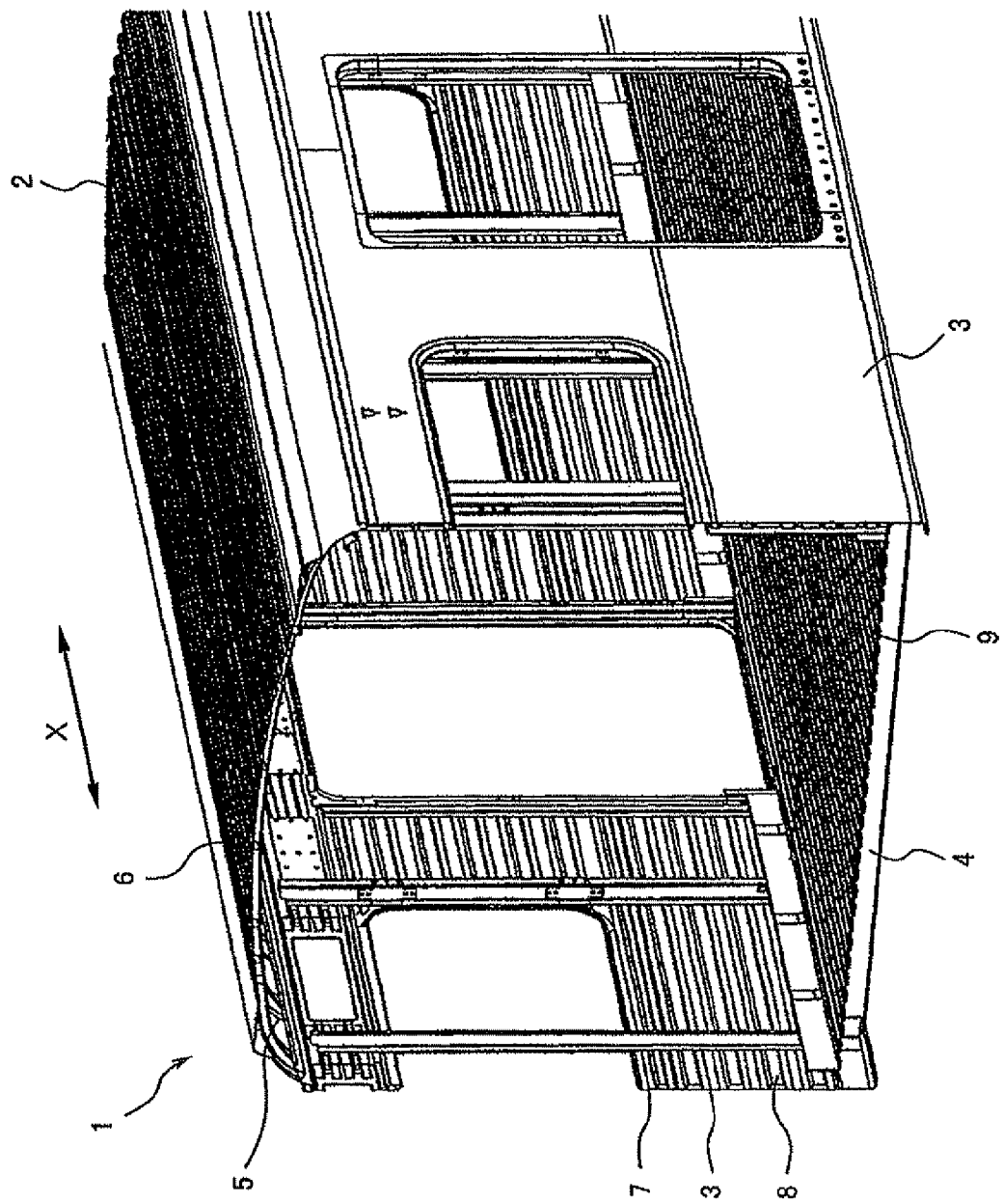
FIG. 1 is a perspective view showing a part of a railcar bodyshell of Embodiment 1 of the present invention.

FIG. 1 is a perspective view showing a part of a railcar bodyshell 1 of Embodiment 1 of the present invention. As shown in FIG. 1, the railcar bodyshell 1 includes a roof bodyshell 2, side bodyshells 3, end bodyshells (not shown), and an underframe 4. The roof bodyshell 2 includes a metal frame 5 and a metal roof board 6 joined to the upper surface of the frame 5. The frame 5 includes purlines and carlines. Each of the side bodyshells 3 include a metal side outside plate 7 and a plurality of metal frame members 8 joined to the inner surface of the side outside plate 7. The side outside plate 7 constitutes a side wall. Moreover, a metal floor panel 9 is joined to the metal underframe 4. The metal used for these members may be stainless steel, aluminum, or the like.

Figure 2:
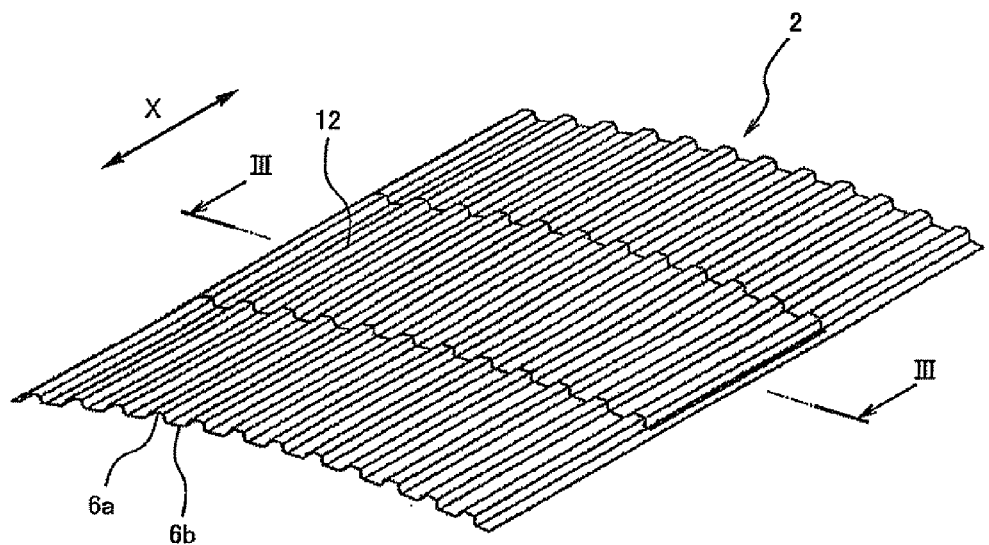
FIG. 2 is a major portion perspective view of a roof bodyshell shown in FIG. 1.
Figure 3:
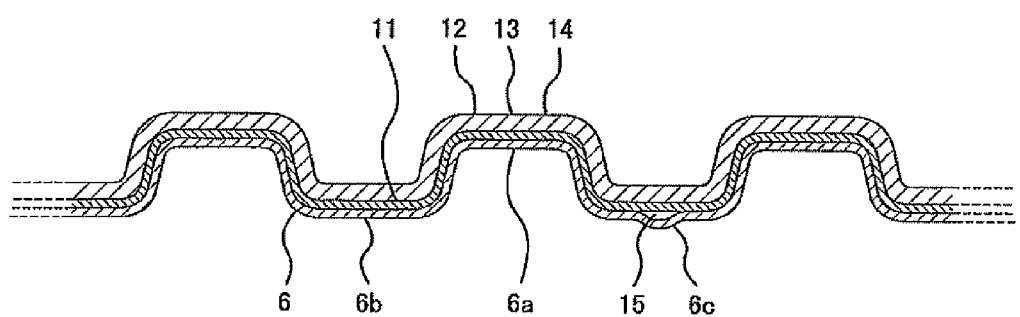
FIG. 3 is an enlarged view showing a part of a cross section taken along line of FIG. 2.

FIG. 2 is a major portion perspective view of the roof bodyshell 2. FIG. 3 is an enlarged view showing a part of a cross section taken along line III-III of FIG. 2. As shown in FIGS. 2 and 3, the roof board 6 is a thin corrugated panel formed such that mountain portions 6a and valley portions 6b extending in a railcar longitudinal direction X are alternately arranged in a railcar width direction. A cross section of the roof board 6 has a wave shape, the cross section being orthogonal to the railcar longitudinal direction X. The roof board 6 is smaller in thickness than the side outside plate 7 of the side bodyshell 3. The thickness of the roof board 6 is from 0.5 to 1.0 mm (for example, 0.6 mm). A carbon fiber reinforced resin member 12 is provided on the roof board 6 of the present embodiment to reinforce a partial region (for example, a center portion in the railcar longitudinal direction X) of the roof board 6. The carbon fiber reinforced resin member 12 is larger in thickness than the roof board 6.

Figure 4:
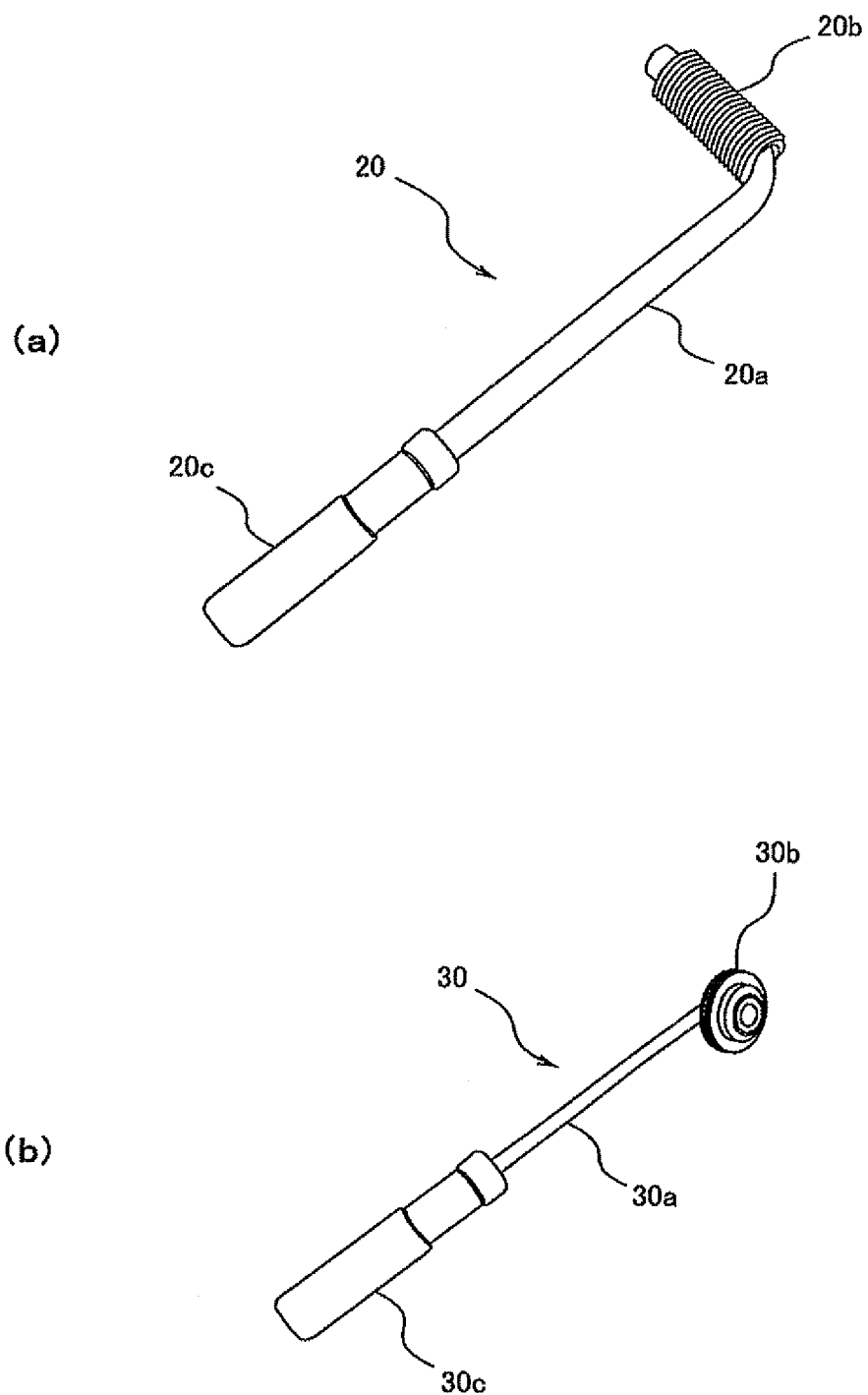
FIG. 4(a) is a perspective view showing a defoaming roller for flat planes.
FIG. 4(b) is a perspective view showing a defoaming roller for corners.

A specific procedure of joining the carbon fiber reinforced resin member 12 is as follows. A reinforcement target portion on the upper surface of the roof board 6 is degreased. A primer 11 (for example, an epoxy resin) made of an impregnated adhesive resin is applied to this target portion and is then left. After the primer 11 is solidified with time, an impregnated adhesive resin 14 (for example, an epoxy resin) is applied as an undercoating onto the primer 11. Before the undercoating is solidified, a resin non-impregnated carbon fiber sheet 13 is stacked on the undercoating. At this time, the carbon fiber sheet 13 is spread along the wave shape of the roof board 6 such that a fiber direction thereof is substantially parallel to the railcar longitudinal direction X. Next, the impregnated adhesive resin 14 is applied to the carbon fiber sheet 13. By using, for example, defoaming rollers 20 and 30 (see FIG. 4), the impregnated adhesive resin 14 is infiltrated into the carbon fiber sheet 13, and the surface of the carbon fiber sheet 13 is flattened. The impregnated adhesive resin 14 is left to be solidified with time. Thus, the carbon fiber reinforced resin member 12 bonded to the roof board 6 is formed. With this, the carbon fiber reinforced resin member 12 achieves an effect of reinforcing a predetermined portion of the thin roof board 6. If a local recess 6c exists on the reinforcement target portion of the roof board 6, the recess 6c may be filled with putty 15, the surface of the putty 15 may be processed to be flush with the surface of its adjacent portion, and the primer 11 may be then applied thereto. However, if the curvature of the recess 6c is small, the primer 11 may be directly applied without filling the recess 6c with the putty 15. Moreover, the carbon fiber sheet 13 may be constituted by one layer or a plurality of layers.

FIG. 4(a) is a perspective view showing a defoaming roller 20 for flat planes. FIG. 4(b) is a perspective view showing a defoaming roller 30 for corners. As shown in FIGS. 4(a) and 4(b), the defoaming roller 20 includes: a rod-shaped supporting portion 20a; a roller portion 20b formed at one end of the supporting portion 20a and having a plurality of grooves extending in a circumferential direction; and a grip portion 20c formed at the other end of the supporting portion 20a, and the defoaming roller 30 includes: a rod-shaped supporting portion 30a; a roller portion 30b formed at one end of the supporting portion 30a and having a plurality of grooves extending in a circumferential direction; and a grip portion 30c formed at the other end of the supporting portion 30a. The roller portion 30b of the defoaming roller 30 for corners is narrower in width than the roller portion 20b of the defoaming roller 20 for flat planes. When viewed from a direction orthogonal to a rotation axis line of the roller portion 30b, the surface of the roller portion 30b has a convex shape in its entirety. The defoaming roller 20 or 30 is used depending on applied portions. By rolling the roller portion 20b or 30b on the surface of the carbon fiber sheet 13, the carbon fiber sheet 13 is caused to spread along the wave shape of the roof board 6 and is impregnated with the impregnated adhesive resin 14 while removing the air between the roof board 6 and the carbon fiber sheet 13.

Figure 5:
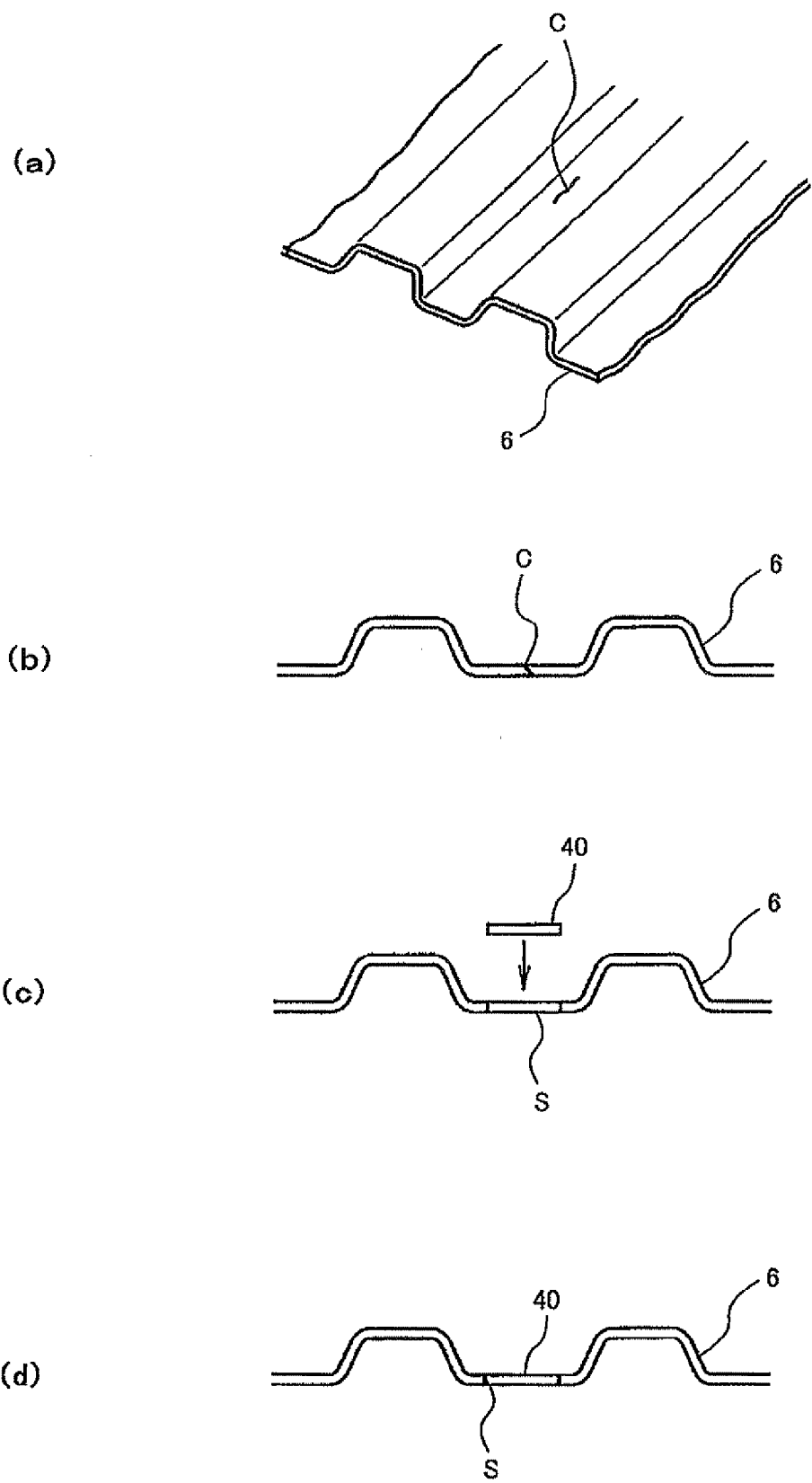
FIGS. 5(a) to 5(d) are diagrams for explaining a procedure of reinforcing a crack on a roof board shown in FIG. 1.

FIGS. 5(a) to 5(d) are diagrams for explaining a procedure of reinforcing a crack C of the roof board 6. The following will explain reinforcement in a case where the crack C is formed on a part of the roof board 6 as shown in FIGS. 5(a) and 5(b). In this case, as shown in FIG. 5(c), a portion surrounding the crack C is removed from the roof board 6. Thus, a circular opening S is formed. Next, as shown in FIG. 5(d), the opening S is closed by a closing plate 40. At this time, the closing plate 40 is temporarily joined to the edge of the opening of the roof board 6 by, for example, welding two portions of the peripheral edge of the closing plate 40. Then, a carbon fiber sheet is bonded to the upper surface of the closing plate 40 and the upper surface of a portion around the closing plate 40 by an impregnated adhesive resin via a primer. Thus, a carbon fiber reinforced resin member is formed. Depending on the status of the crack C, the carbon fiber sheet may be directly bonded to the crack C and the portion around the crack C by the impregnated adhesive resin without forming the opening S. For example, in a case where the crack is generated but is not growing and has a linear shape, and water leakage is small in amount, it is unnecessary to remove the crack. In contrast, in a case where the crack is growing and can be visually confirmed, and the water leakage is large in amount, it is desirable to remove the crack and then provide the closing plate.

Figure 6:
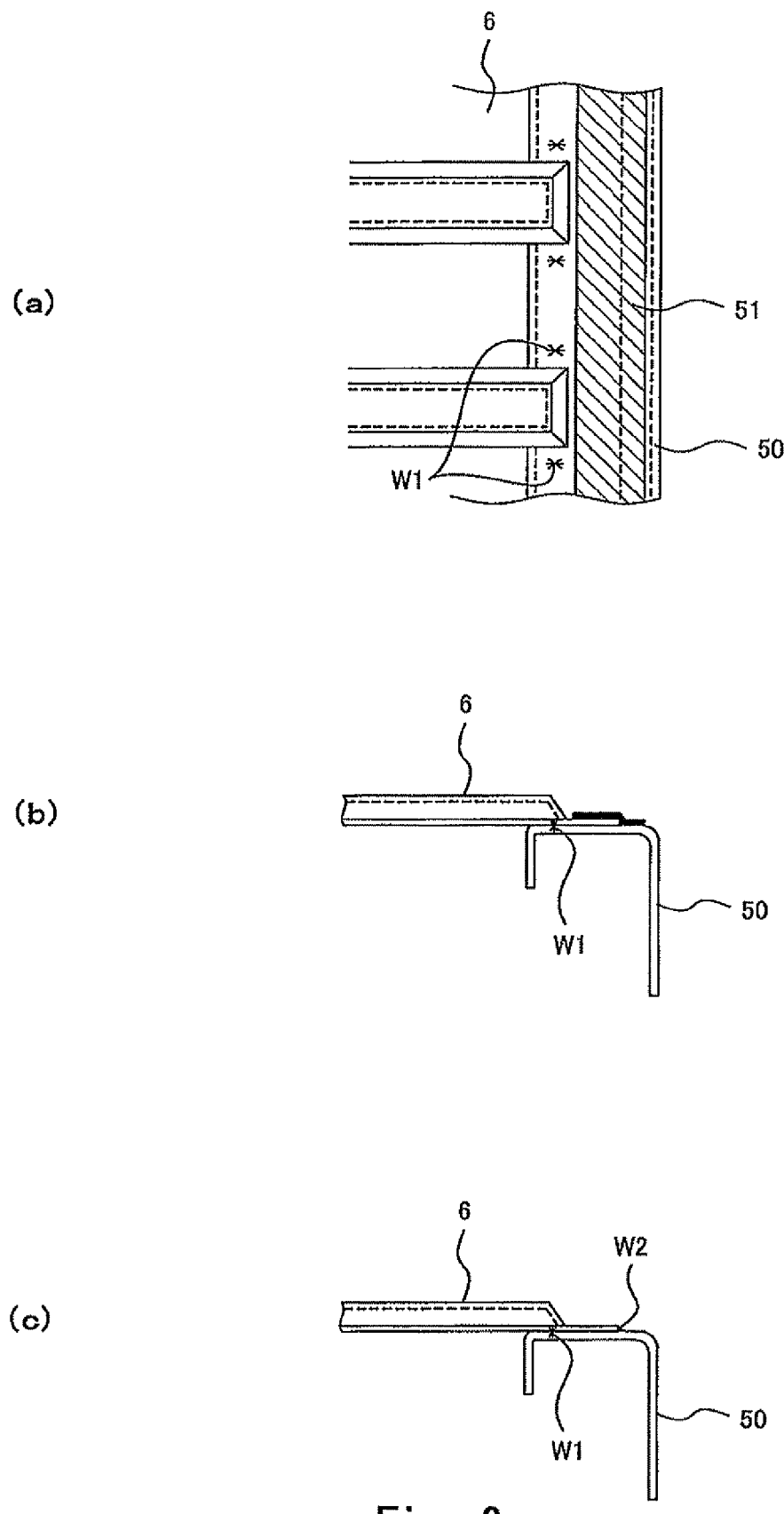
FIG. 6(a) is a major portion plan view showing a connection portion where the roof board of FIG. 1 and an end bodyshell are connected to each other.
FIG. 6(b) is a major portion cross-sectional view thereof.
FIG. 6(c) is a diagram of a conventional example and corresponds to FIG. 6(b).

FIG. 6(a) is a major portion plan view showing a connection portion where the roof board 6 and an end bodyshell 50 are connected to each other. FIG. 6(b) is a major portion cross-sectional view thereof. FIG. 6(c) is a diagram of a conventional example and corresponds to FIG. 6(b). As shown in FIG. 6(c), in the conventional example, when joining a front end portion of the roof board 6 and an upper end portion of the end bodyshell 50 each other, these are fixed by spot welding W1, and fillet continuous welding W2 is further performed. This is because the seal performance is required. In this case, distortion of the roof board 6 by the heat affect of the fillet continuous welding W2 becomes significant. Here, as shown in FIGS. 6(a) and 6(b), the front end portion of the roof board 6 is stacked on a part of the upper end portion of the end bodyshell 50, and these are joined to each other by the spot welding W1. Then, a carbon fiber sheet is disposed to cover both the front end portion of the roof board 6 and the upper end portion of the end bodyshell 50 and is then bonded by the impregnated adhesive resin to both the front end portion of the roof board 6 and the upper end portion of the end bodyshell 50. Thus, a carbon fiber reinforced resin member 51 is formed. With this, the distortion of the roof board 6 by the heat affect of the fillet continuous welding does not occur, the seal performance can be secured, and the end portion of the roof board 6 can be reinforced.

Figure 7:
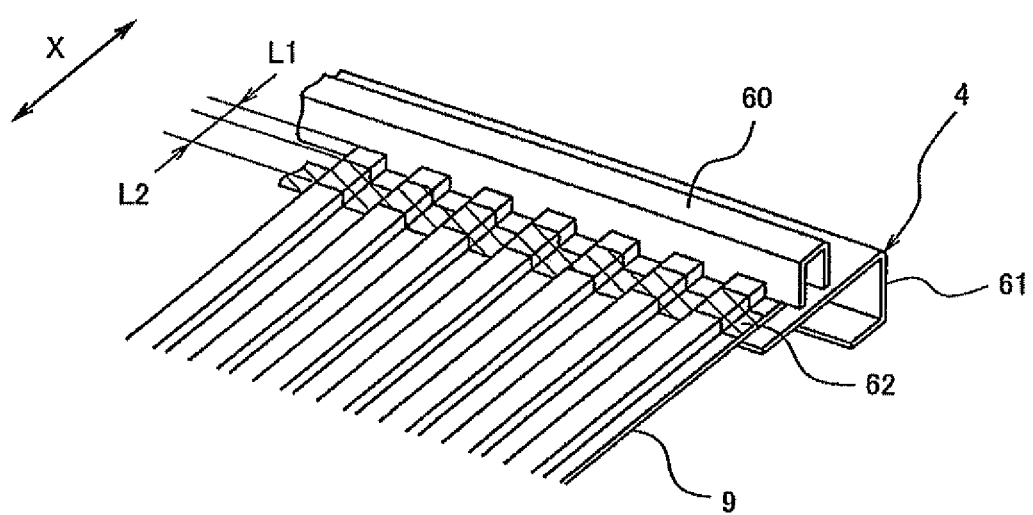
FIG. 7 is a major portion perspective view showing a connection portion where the underframe of FIG. 1 and a floor panel are connected to each other.

FIG. 7 is a major portion perspective view showing a connection portion where the underframe 4 and the floor panel 9 are connected to each other. As shown in FIG. 7, the floor panel 9 is a thin metal plate formed such that a cross section thereof orthogonal to the railcar longitudinal direction X has a wave shape. The thickness of the floor panel 9 is from 0.6 to 1.2 mm (for example, 0.6 mm). A rear end member 60 having an inversed concave cross section and extending in the carbody width direction is joined to the upper surface of an end beam 61 of the underframe 4. Before the end portion of the floor panel 9 is fillet welded to a side surface of the rear end member 60, the carbon fiber sheet is bonded to the end portion of the floor panel 9 in advance via the primer by the impregnated adhesive resin. Thus, a carbon fiber reinforced resin member 62 is formed. With this, the stiffness of the floor panel 9 increases, and the shape thereof is stabilized. Then, the end portion of the floor panel 9 is fillet welded to the side surface of the rear end member 60. With this, since the shape of the floor panel 9 is stabilized by the carbon fiber reinforced resin member 62, the distortion by the heat affect is suppressed. A range where the carbon fiber reinforced resin member 62 is provided may be a range which has a width of L2 (50 to 100 mm) and is spaced apart from the end portion (fillet welded portion) of the floor panel 9 by L1 (5 to 10 mm).

As explained above, the carbon fiber sheet 13 having flexibility is spread along a partial region of the metal roof board 6 or floor panel 9 having the wave-shaped cross section to be impregnated with and bonded by the impregnated adhesive resin 14. With this, the fiber reinforced resin member 12 bonded to the roof board 6 or the like can be formed easily. Moreover, the roof board 6 or the like can be reinforced by a simple process while reducing the carbody weight. In addition, since the carbon fiber sheet 13 is disposed on a partial region of the roof board 6 or the like, impregnated and bonded, the manufacturing accuracy does not deteriorate by the thermal distortion, and the water-tightness does not deteriorate by the damage on the bolt hole. Further, since the carbon fiber sheet 13 is disposed on a partial region of the roof board 6 or the like, and the frame 5, the roof board 6, and the like that are major portions are made of metal, the cost and the recyclability can be appropriately maintained. As above, the cost, recyclability, and manufacturing efficiency of the railcar bodyshell 1 can be appropriately maintained while improving the manufacturing accuracy and water-tightness thereof and reducing the carbody weight thereof.

Embodiment 2

Figure 8:
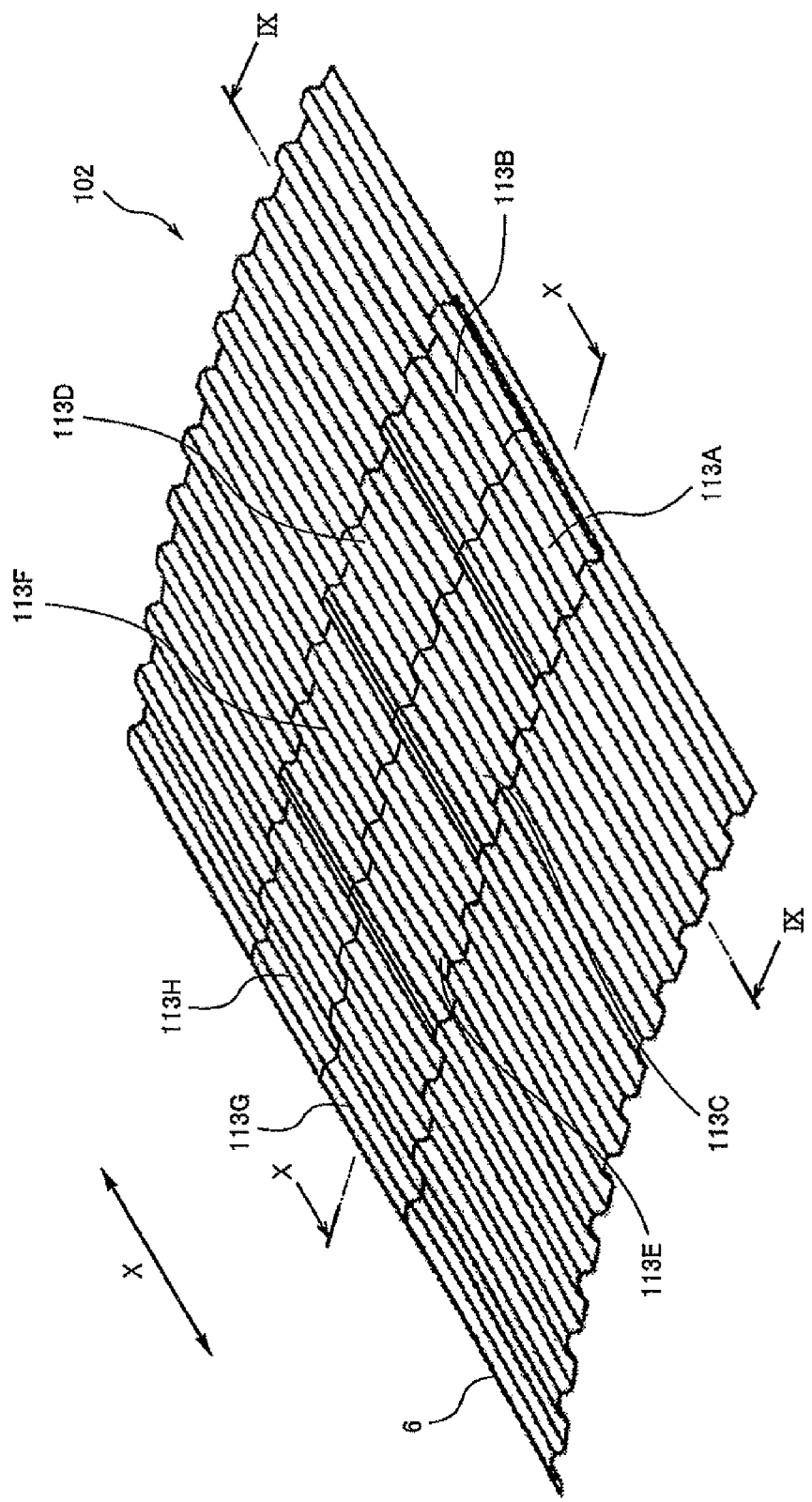
FIG. 8 is a major portion perspective view of the roof bodyshell of Embodiment 2 of the present invention.
Figure 9:
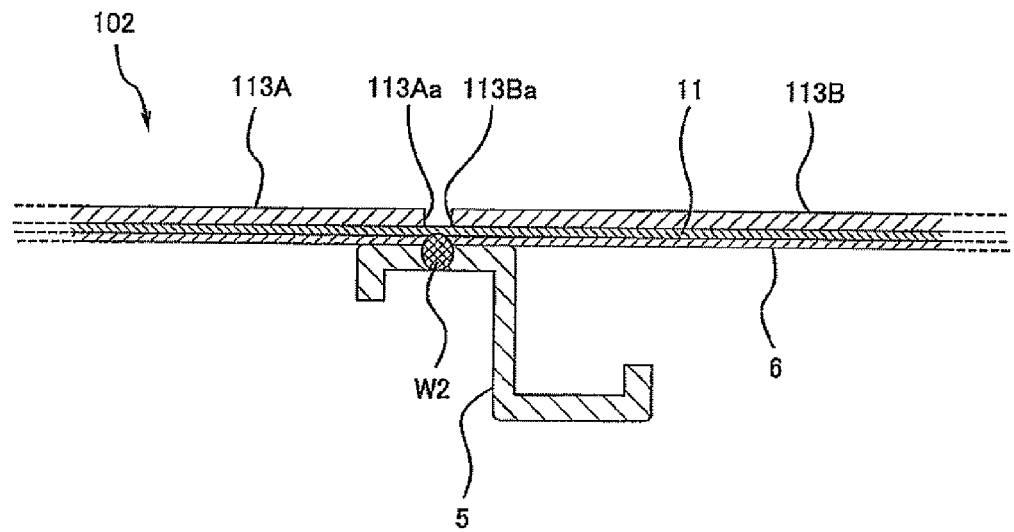
FIG. 9 is an enlarged view showing a part of a cross section taken along line IX-IX of FIG. 8.
Figure 10:
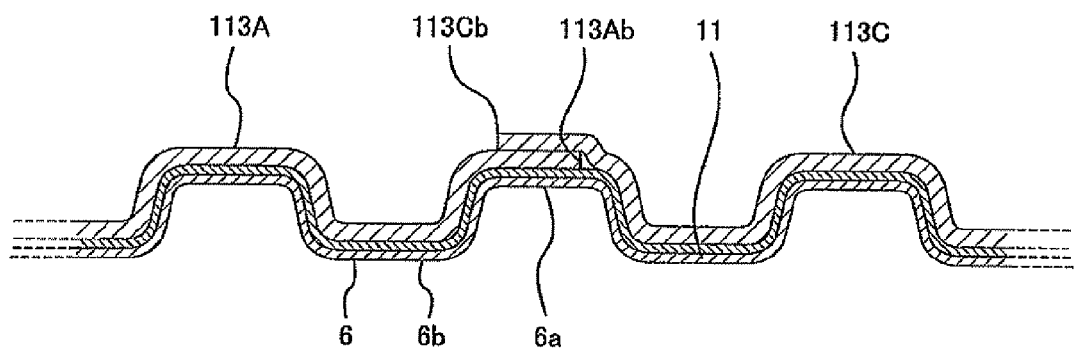
FIG. 10 is an enlarged view showing a part of a cross section taken along line X-X of FIG. 8.

FIG. 8 is a major portion perspective view of a roof bodyshell 102 of Embodiment 2 of the present invention. FIG. 9 is an enlarged view showing a part of a cross section taken along line IX-IX of FIG. 8. FIG. 10 is an enlarged view showing a part of a cross section taken along line X-X of FIG. 8. As shown in FIG. 8, in the roof bodyshell 102 of the present embodiment, a plurality of carbon fiber sheets 113A to 113H each having a rectangular shape in plan view are arranged so as to spread all over the upper surface of the partial region of the roof board 6 via the primer 11 (see FIG. 9). Since a procedure of forming the carbon fiber reinforced resin member by bonding these carbon fiber sheets 113A to 113H to the partial region of the roof board 6 by the impregnated adhesive resin is the same as that in Embodiment 1, a detailed explanation thereof is omitted herein.

As shown in FIG. 9, the roof board 6 is joined to the frame 5 by the spot welding W2. A rear end portion 113Aa of the carbon fiber sheet 113A and a front end portion 113Ba of the carbon fiber sheet 113B is located above the frame 5, the front end portion 113Ba being adjacently located on a rear side of the rear end portion 113Aa. The end portions 113Aa and 113Ba opposed to each other are arranged such that a space is formed therebetween and just above a spot welded portion W2. As shown in FIG. 10, a right end portion 113Ab of the carbon fiber sheet 113A and a left end portion 113Cb of the carbon fiber sheet 113C are located at the mountain portion 6a of the roof board 6, the left end portion 113Cb being adjacently located on a right side of the right end portion 113Ab. The end portions 113Ab and 113Cb opposed to each other are joined to each other so as to overlap each other.

As explained above, since the plurality of carbon fiber sheets 113A to 113H each having a rectangular shape in plan view are arranged so as to spread all over, the size of the carbon fiber sheet handled by a worker at one time is reduced, and this improves workability. Moreover, since the end portions 113Aa and 113Ba, which are opposed to each other in the railcar longitudinal direction, of the carbon fiber sheets 113A and 113B are spaced apart from each other so as to avoid the spot welded portion W2, the adhesion of the end portions 113Aa and 113Ba is stabilized. Further, since the end portions 113Ab and 113Cb, which are adjacent to each other in the railcar width direction, of the carbon fiber sheets 113A and 113C are located at the mountain portion 6a of the roof board 6, the works of impregnating and bonding these end portions 113Ab and 113Cb are easily performed, and the adhesion between these end portions 113Ab and 113Cb is stabilized. Moreover, these end portions 113Ab and 113Cb overlap each other. Therefore, even if there are size errors among the carbon fiber sheets 113A to 113H, a desired size as the plurality of carbon fiber sheets arranged can be realized by adjusting the amount of overlap. The other components are the same as those in Embodiment 1, so that explanations thereof are omitted.

Embodiment 3

Figure 11:
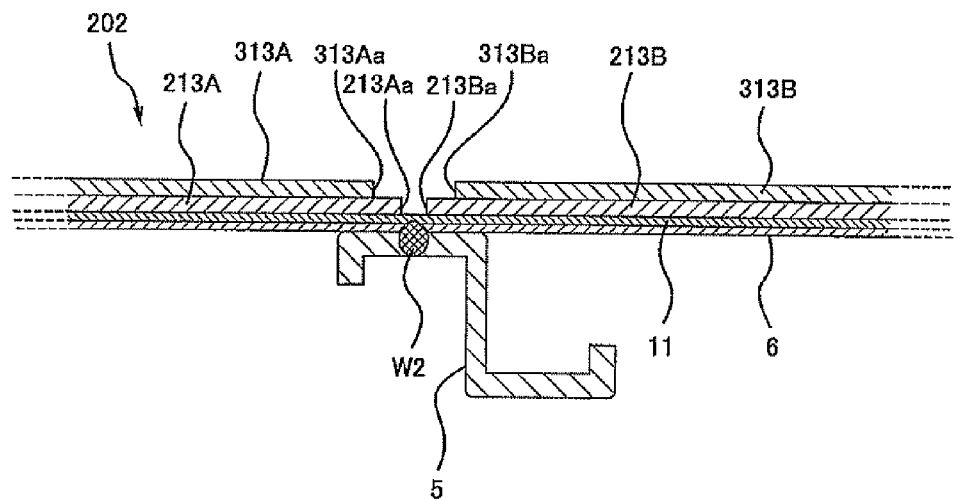
FIG. 11 is a diagram of the roof bodyshell of Embodiment 3 of the present invention and corresponds to FIG. 9.
Figure 12:
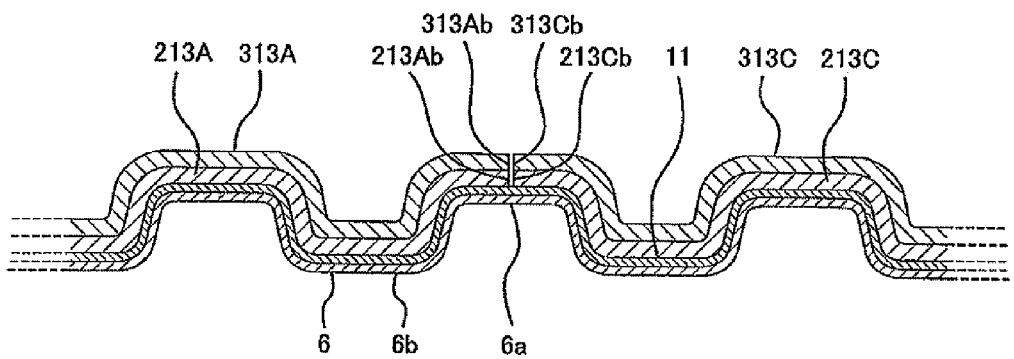
FIG. 12 is a diagram of the roof bodyshell of FIG. 11 and corresponds to FIG. 10.

FIG. 11 is a diagram of a roof bodyshell 202 of Embodiment 3 of the present invention and corresponds to FIG. 9. FIG. 12 is a diagram of the roof bodyshell 202 shown in FIG. 11 and corresponds to FIG. 10. As shown in FIGS. 11 and 12, in the roof bodyshell 202 of the present embodiment, carbon fiber sheets 213A to 213C and 313A to 313C are arranged such that a plurality of layers (for example, two layers) are stacked. As shown in FIG. 11, railcar-longitudinal end portions 313Aa and 313Ba of the carbon fiber sheets 313A and 313B as the second layers are arranged so as to be displaced by about 5 to 10 mm such that a gap therebetween is larger than a gap between railcar-longitudinal end portions 213Aa and 213Ba of the carbon fiber sheets 213A and 213B as the first layers. To be specific, the end portions of the stacked carbon fiber sheets are arranged in a step shape. Therefore, stress concentration is relieved.

As shown in FIG. 12, railcar-width-direction end portions 213Ab and 213Cb of the carbon fiber sheets 213A and 213C as the first layers and railcar-width-direction end portions 313Ab and 313Cb of the carbon fiber sheets 313A and 313C as the second layers are arranged at substantially the same position when viewed from above. The right end portions 213Ab and 313Ab of the carbon fiber sheets 213A and 313A and the left end portions 213Cb and 313Cb of the carbon fiber sheets 213C and 313C are located at the mountain portion 6a of the roof board 6, the left end portions 213Cb and 313Cb being adjacently located on a right side of the right end portion 213Ab and 313Ab, respectively. The right end portion 213Ab and the left end portion 213Cb opposed to each other are arranged so as not to overlap each other but to face each other, and the right end portion 313Ab and the left end portion 313Cb opposed to each other are arranged so as not to overlap each other but to face each other.

As explained above, by stacking a plurality of carbon fiber sheets 213A to 213C and 313A to 313C, desired strength and stiffness can be given to the roof board 6 or the like. The other components are the same as those in Embodiment 1, so that explanations thereof are omitted.

EXAMPLE

Hereinafter, Example of a process procedure of joining the carbon fiber reinforced resin member to the railcar bodyshell will be explained. The process is carried out at an ambient temperature of about 0 to 40° C. First, carbon fiber sheets, primers, and impregnated adhesive resins are prepared. Used as the carbon fiber sheet is a highly-elastic unidirectional material (FTS-C8-30 produced by Nippon Steel Composite Co., Ltd.). Properties of carbon fiber contained in the carbon fiber sheet are as follows: Tensile strength is 1,900 N/mm$^2$, and tensile elasticity is $6.4\times10^5$ N/mm$^2$. Used as the primer is a two-liquid mixing type epoxy resin (FP-NSL produced by Nippon Steel Materials Co., Ltd, Composites Company: Viscosity of about 1,000 mPa·s). Used as the impregnated adhesive resin is a two-liquid mixing type epoxy resin (FR-E3PL produced by Nippon Steel Materials Co., Ltd, Composites Company: Viscosity of about 4,400 mPa·s). Steps (1) to (7) below are carried out in order.

(1) Surface Preparation

A predetermined portion which requires reinforcement is grinded by a grinder (for example, #100) or is so-called BG#80 finish (a finish direction is the railcar longitudinal direction). Then, dirt is removed from the surface of the predetermined portion by adequately degreasing the surface by acetone.

(2) Cutting of Carbon Fiber Sheet

The carbon fiber sheet is cut by using cutting tools, such as a cutter knife and a ruler, into a desired shape corresponding to the predetermined portion.

(3) Application of Primer

The primer is applied by using a roller brush at a ratio of, for example, 200 g/m$^2$ and is left for two to four hours or longer (preferably about a day). Here, the purposes of applying the primer are to protect the surface of the roof board immediately after the roof board is grinded and to avoid the generation of the corrosion by a potential difference between the carbon fiber of the carbon fiber reinforced resin and the roof board directly contacting each other. To be specific, the primer also serves as the insulating layer. Moreover, the reason why the amount of primer applied is managed is because it is difficult to manage the thickness of the resin during the process. Moreover, the reason why the viscosity of the primer is lower than that of the impregnated adhesive resin is because it is necessary to smoothly spread the primer on the surface of the roof board.

(4) Undercoating of Impregnated Adhesive Resin

The impregnated adhesive resin is applied by the roller brush as an undercoating. For example, used for one layer of the impregnated adhesive resin is 500 g/m$^2$. Here, the impregnated adhesive resin is prepared such that a main agent and a hardening agent are measured and mixed at a predetermined mixing ratio (Main Agent:Hardening Agent=2:1), and then uniformly kneaded by a spatula.

(5) Attaching of Carbon Fiber Sheet

Before the undercoating is solidified, the carbon fiber sheet is attached so as to spread along the roof board by pressing the carbon fiber sheet with hands of a worker. At this time, since the viscosity of the impregnated adhesive resin is high, the carbon fiber sheet is not displaced. Then, the carbon fiber sheet is rubbed with a degassing roller and is impregnated with the impregnated adhesive resin. Then, the carbon fiber sheet is left for about 30 minutes. Thus, the impregnation proceeds by capillarity (the impregnated resin comes to the surface from between the fibers).

(6) Overcoating of Impregnated Adhesive Resin

Further, the impregnated adhesive resin is applied thereto by the roller brush as an overcoating. For example, used for one layer of the impregnated adhesive resin is 300 g/m$^2$, which is smaller than that of the undercoating. Here, used for one undercoating is 500 g/m$^2$, and used for one overcoating is 300 g/m$^2$. The reason why the undercoating is larger in amount than the overcoating is because the sheet is efficiently impregnated with the resin by the capillarity so as to be held during the impregnation.

(7) Second and Subsequent Layers

According to need, the process returns to the step (4), and the carbon fiber sheet is attached as the second or subsequent layer. The amount of resin used between the sheets is determined in consideration of workability and ease of impregnation. However, the amount of resin used between the sheets can be changed in accordance with the amount of fiber per unit volume such that the fiber and the resin are contained at a substantially equal rate.

REFERENCE SIGNS LIST 1 railcar bodyshell
2 roof bodyshell 3 side bodyshell
4 underframe
5 frame
6 roof board
9 floor panel
11 primer
12 carbon fiber reinforced resin member
13, 113A to 113H, 213A to 213C, 313A to 313C carbon fiber sheet
14 impregnated adhesive resin

The invention claimed is:

1. A method for reinforcing a railcar bodyshell, comprising the steps of:
  providing a bodyshell, the bodyshell having a metal frame and a metal plate joined to the metal frame, the metal plate being formed such that a cross section thereof that is orthogonal to a longitudinal direction of a railcar has a wave shape;
  disposing a fiber sheet on at least a part of the metal plate; and
  forming a fiber reinforced resin member by bonding the fiber sheet to the at least part of the metal plate by an impregnated adhesive resin, wherein
    before the step of disposing the fiber sheet, an opening is formed by removing a portion surrounding a crack on the part of the metal plate, and the opening is closed by a closing plate; and
    in the step of disposing the fiber sheet, the fiber sheet is disposed so as to cover the closing plate and a portion around the closing plate.

2. A method for reinforcing a railcar bodyshell, comprising the steps of:
  providing a bodyshell, the bodyshell having a metal frame and a metal plate joined to the metal frame, the metal plate being formed such that a cross section thereof that is orthogonal to a longitudinal direction of a railcar has a wave shape;
  disposing a fiber sheet on at least a part of the metal plate; and
  forming a fiber reinforced resin member by bonding the fiber sheet to the at least part of the metal plate by an impregnated adhesive resin, wherein
    the metal plate is formed to be smaller in thickness than the fiber reinforced resin member;
    the metal plate is welded to the frame by spot welding; and
    in the step of disposing the fiber sheet, a plurality of fiber sheets are disposed so as to spread all over the at least part of the metal plate, and end portions, opposed to each other in the longitudinal direction of the railcar, of the plurality of fiber sheets are arranged such that a space is formed therebetween and just above a portion welded by the spot welding.

3. A method for reinforcing a railcar bodyshell, comprising the steps of:
  providing a bodyshell, the bodyshell having a metal frame and a metal plate joined to the metal frame, the metal plate being formed such that a cross section thereof that is orthogonal to a longitudinal direction of a railcar has a wave shape;
  disposing a fiber sheet on at least a part of the metal plate; and
  forming a fiber reinforced resin member by bonding the fiber sheet to the at least part of the metal plate by an impregnated adhesive resin, wherein
    in the step of disposing the fiber sheet, a plurality of fiber sheets are disposed so as to spread all over the part of the metal plate;
    each of the plurality of fiber sheets has a rectangular shape in plan view; and
    in the step of disposing the fiber sheet, opposing end portions of adjacent fiber sheets among the plurality of fiber sheets are located at a mountain portion of the wave shape of the metal plate.

4. The method according to claim 3, wherein end portions, opposed to each other in a railcar width direction, of the adjacent fiber sheets are joined so as to overlap each other.

5. A method for reinforcing a railcar bodyshell, comprising the steps of:
  providing a bodyshell, the bodyshell having a metal frame and a metal plate joined to the metal frame, the metal plate being formed such that a cross section thereof that is orthogonal to a longitudinal direction of a railcar has a wave shape;
  disposing a fiber sheet on at least a part of the metal plate; and
  forming a fiber reinforced resin member by bonding the fiber sheet to the at least part of the metal plate by an impregnated adhesive resin, wherein
    the metal plate is a roof board;
    in the step of disposing the fiber sheet, the fiber sheet is disposed so as to cover both a front end portion of the roof board and an upper end portion of an end bodyshell, the front end portion of the roof board overlapping and being joined to a part of the upper end portion of the end bodyshell; and
    in the step of forming the fiber reinforced resin member, the fiber sheet is bonded by an impregnated adhesive resin to both the front end portion of the roof board and the upper end portion of the end bodyshell.

6. A method for reinforcing a railcar bodyshell, comprising the steps of:
  providing a bodyshell, the bodyshell having a metal frame and a metal plate joined to the metal frame, the metal plate being formed such that a cross section thereof that is orthogonal to a longitudinal direction of a railcar has a wave shape;
  disposing a fiber sheet on at least a part of the metal plate; and
  forming a fiber reinforced resin member by bonding the fiber sheet to the at least part of the metal plate by an impregnated adhesive resin, wherein
    the metal plate is formed to be smaller in thickness than the fiber reinforced resin member;
    the metal plate is a floor panel;
    a carbon fiber reinforced resin member is formed by bonding the fiber sheet to an end portion of the floor panel; and
    the end portion of the floor panel is welded by fillet welding to a side surface of a rear end member joined to an upper surface of an end beam of an underframe and extending in a railcar width direction.

* * * * *